United States Patent [19]

Jones

[11] 3,927,903
[45] Dec. 23, 1975

[54] FOLDABLE STEP
[76] Inventor: George D. Jones, 19624 96th St. E., Sumner, Wash. 98390
[22] Filed: Aug. 28, 1974
[21] Appl. No.: 501,343

[52] U.S. Cl. ............................................. 280/166
[51] Int. Cl.² ............................................ B60R 3/02
[58] Field of Search ............... 280/166, 163; 182/91

[56] References Cited
UNITED STATES PATENTS
3,394,947  7/1968  Strube................................ 280/166
3,507,515  4/1970  Brammer........................... 280/166

Primary Examiner—Robert R. Song
Attorney, Agent, or Firm—Morris A. Case

[57] ABSTRACT

A step, for attachment to a bumper of a truck, extending outward and below the top of the bumper and foldable to a position above the bumper with the step contact surface upward and lying essentially parallel to the top of the bumper. A step is pivotally connected to a pair of support members that in turn are pivotally supported to legs attached to the bumper. A slotted offset link extends from each side of the step to a support member.

3 Claims, 10 Drawing Figures

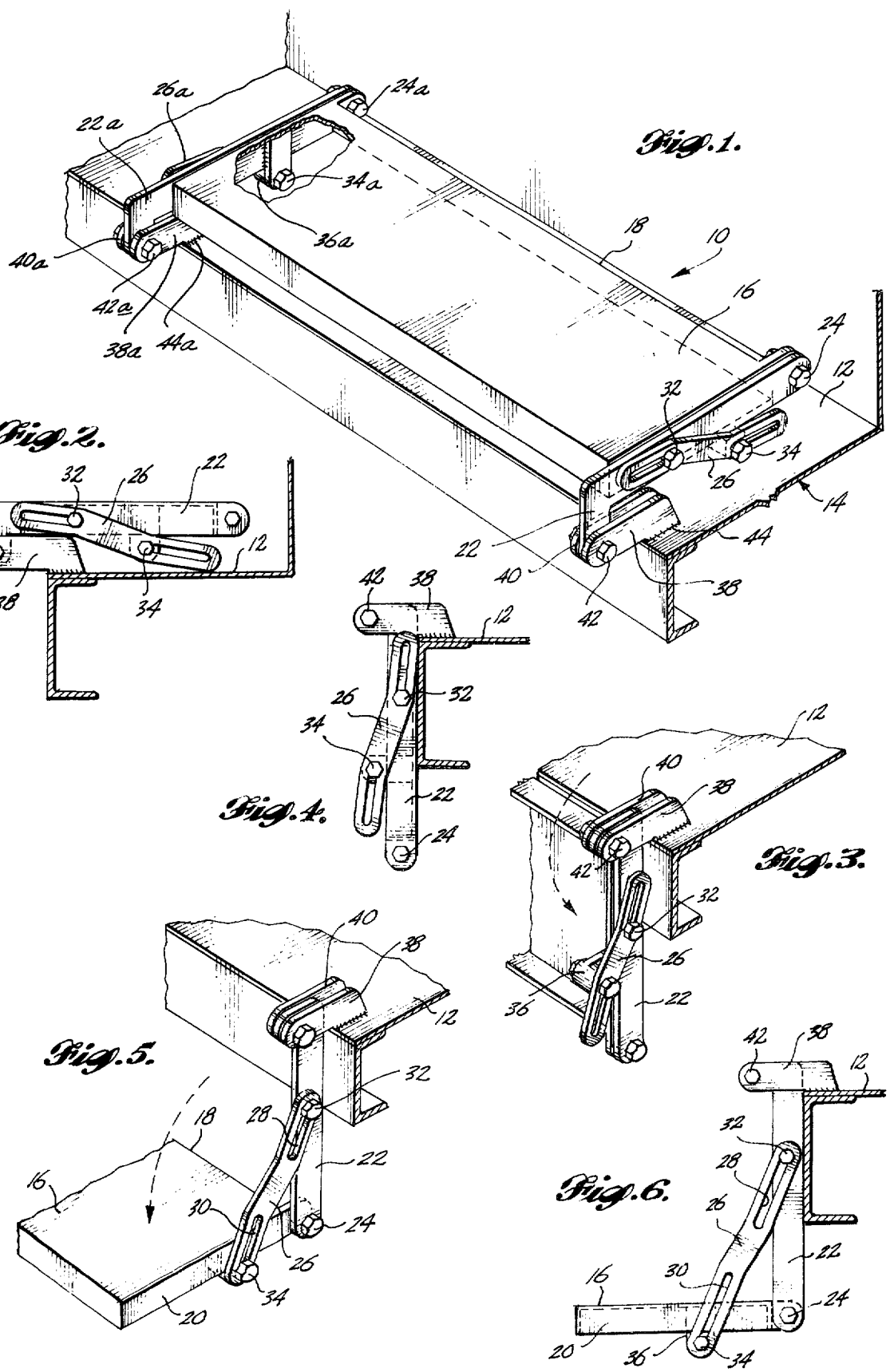

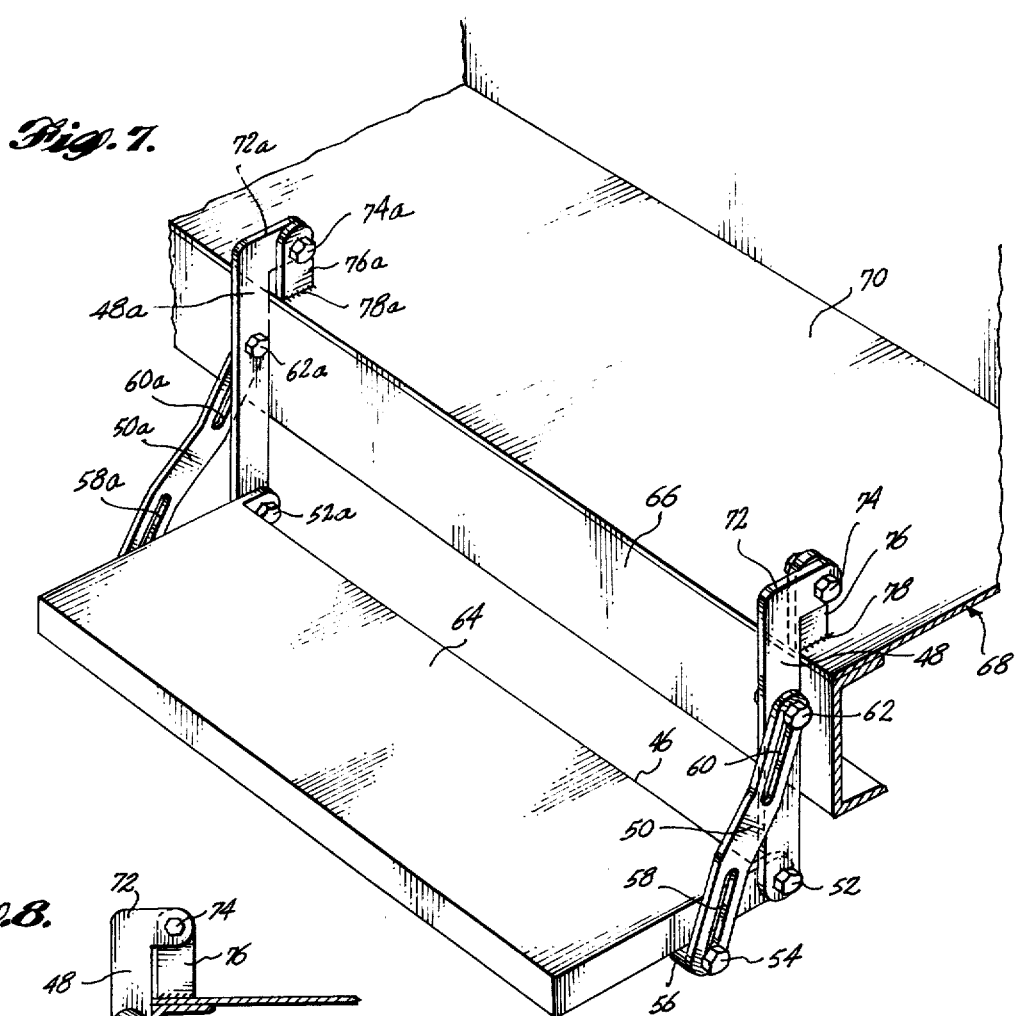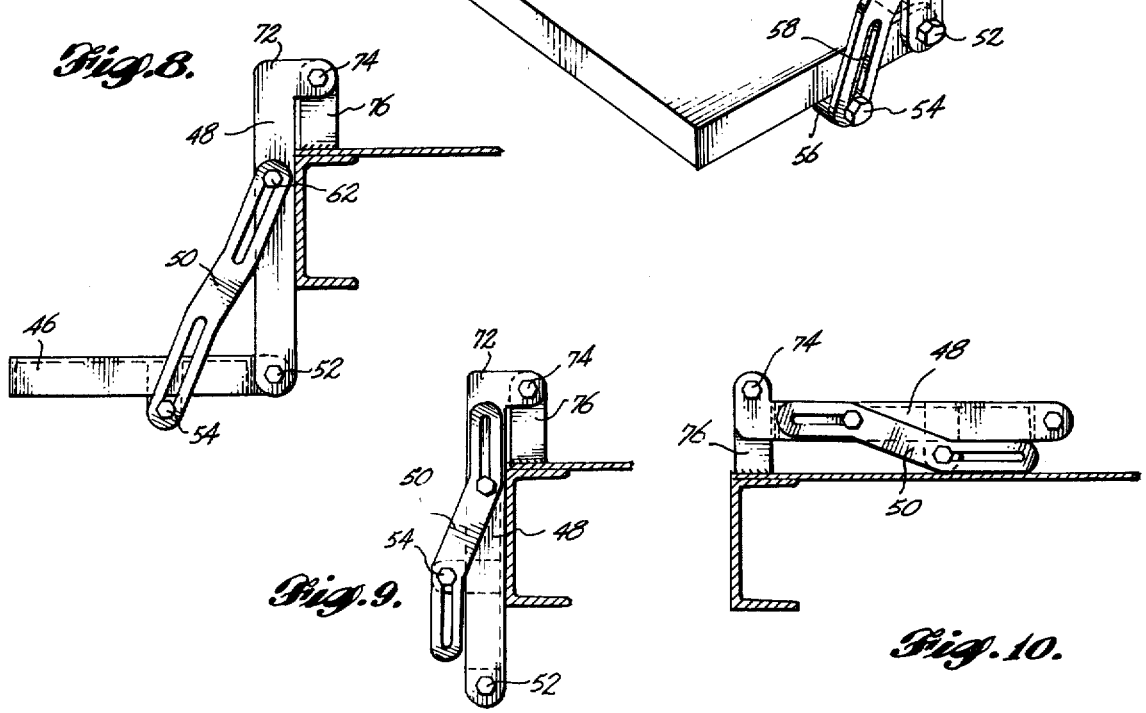

FOLDABLE STEP

BACKGROUND OF THE INVENTION

With the popularity of the pickup truck campers it has also become popular to shape the rear bumper with a wide tread to serve the dual purpose of being both a bumper and a step. The top of the bumper is flat and extends rearward for about six to eight inches to give a step like surface. Unfortunately, however, the bumper is high enough off the ground that it is difficult to reach.

U.s. Pat. No. 3,716,254 by Tarvin discloses a detachable unit that bolts to the back of the bumper with a top step extending coextensive with the top of the bumper and a second foldable step attached thereto. U.S. Pat. No. 3,463,509 by Schiffner and U.S. Pat. No. 3,392,990 by Wolf each disclose a step or series of steps that rotate upward to be fastened to the back of the camper when not in use. U.S. Pat. No. 3,645,557 by Aldropp folds then pushes the steps into a rack under the bumper when not in use. In U.S. Pat. No. 3,507,515 Brammer discloses a pair of steps one of which is located immediately on top of the bumper with a lower step which folds upward when not in use to cover the first step.

SUMMARY OF THE DISCLOSURE

A pair of legs or bars are fastened to the top of the bumper. These legs are spaced apart about the width of a step. A pair of L-shaped supports or links are pivotally mounted to the legs with the pivot point near the end of the short arm of the support. The supports span a step which is pivotally mounted thereto at a point near the long arm end of the support. An offset link extends between the side of the support and the side of the step with a separate link on either side. Each link has a pair of slots to work with pins extending from the support and the step.

An object of this invention is to provide a foldable step for the bumper of a camper or the like to be easily folded to the top of the bumper when not in use.

DESCRIPTION OF THE DRAWINGS

FIG. 1 shows a perspective view of a foldable step device, partially broken away, folded on top of a truck bumper.

FIG. 2 is a side elevation of the device of FIG. 1.

FIG. 3 shows a fragmented perspective view of the device of FIG. 1 with the device rotated ninety degrees.

FIG. 4 is a side elevation of the step device as shown in FIG. 3.

FIG. 5 is a fragmented perspective view of the device of FIG. 1 extended into the step position.

FIG. 6 is a side elevation of the fully extended step.

FIG. 7 shows a perspective view of a different embodiment of a foldable step device with the step extended to the use position.

FIG. 8 is a side elevational section of the fully extended step of FIG. 7.

FIG. 9 shows a side elevational sectional view of the device of FIG. 8 with the step partially folded.

FIG. 10 shows a side elevational sectional view of the device of FIG. 8 with the step completely folded onto the top of a bumper.

DETAILED DESCRIPTION

Foldable step device 10 is shown in FIG. 1 in the folded position on the top surface 12 of a bumper 14. In the folded position a contact or working surface 16 of step 18 is facing upward and lies in a plane essentially parallel to the top of the bumper. With the step positioned for use as best shown in FIGS. 5 and 6 the contact surface 16 is also facing upward and is also parallel to the top of the bumper, but the step now extends outward from and below the top of the bumper to offer a step conveniently located for use. The step is pivotally mounted near the back, and at one side 20, to support member 22 by bolt 24. The step is further supported along the side by offset linkage 26 which limits movement of the step to a position about ninety degrees from the support member. The offset linkage has a pair of slots 28 and 30. A pin 32 fastened to support member 22 slideably works in slot 28 and pin 34 works in slot 30. Pin 34 is held by bracket 36 which in turn is fastened or welded to the side 20 of step 18. The slots each of which extends inward from near an end of the linkage limit the movement of the step while allowing folding the step into a position in line with the support as best shown in FIGS. 3 and 4. The opposite side 20a of the step 16 is supported in a manner identical to the support for side 20 with a pivotal mounting to support 22a by pin 24a and to linkage 26a by pin 34a. The supports 22 and 22a are each in turn pivotally mounted to a bracket or bar 38 and 40 and bar 38a and 40a by bolt 42 and 42a respectively. The bars may be as shown here with two bars for each support member or a single bar may be used for each support member. The bars in this embodiment are shown welded at 44 to the top surface 12 of the bumper 14 but may be suitably fastened by other means such as with a clip angle bolted to the bumper. The bars in this embodiment extends outward from the bumper to allow folding the step into a parallel position with respect to the top surface of the bumper when installed on a bumper less deep than the depth of the step.

In operation the step is folded as shown in FIG. 1 and the step contact surface 16 is parallel with and above the top 12 of the bumper 14. This is the normal position for travel and the step may be used in this position. To place the step in position for convenient use it is first rotated with the support member to a position normal to the top of the bumper, as shown in FIGS. 3 and 4, and then the step is rotated to a position normal to the support with the contact surface of the step facing up. The steps are reversed to fold the step out of the way.

In FIGS. 7 through 10 is shown an embodiment as used on a wide bumper to allow clearing the back of the bumper when in the folded position. The step 46 when in the extended for use position, as best shown in FIG. 7, is supported across its span by extending between a pair of L-shaped support or linkage members 48 and 48a, and a pair of offset linkage members 50 and 50a. The step being pivotally mounted along the side and near the back to the support members with bolts 52 and 52a. The step is pivotally mounted to the pair of linkage members at an intermediate position along each side with pins 54 and 54a. The pins are held by bracket 56 and 56a which in turn are fastened to the step by any convenient means which in this embodiment is by welding. The linkages 50 and 50a each have a pair of slots extending inward from near each end with slots 58 and 58a working with pins 54 and 54a and slots 60 and 60a working with pins 62 and 62a which are joined to the L-shaped support members. With the step fully extended the length of the slots in the linkages positions the working surface 64 of the step to be at about ninety degrees from the line of the support members which in turn rests against the back 66 of bumper 68 and lie in a plane normal to the top surface 70 of the bumper. Thus, in the extended position the contact or working surface of the step extends beyond and lies in a plane below and parallel to the top of the bumper. The short arms 72 and 72a of the L-shaped support members are pivotally mounted near the end by bolts 74 and 74a to upstanding spaced apart bars or legs 76 and 76a respectively. The legs in this embodiment are welded at 78 and 78a respectively to the bumper. To fold the step it is first rotated to a parallel position in line with support members as shown in FIG. 9, and then further rotated around bolts 74 and 74a to the folded position where the contact surface is above and parallel to the top of the bumper and the step device completely clears the back of the bumper. All parts of the foldable step device may be used for either embodiment shown. The L-shaped support members are turned around and the legs or bars are positioned upright or extend outwards as required for the depth of truck bumper being used.

It is apparent that various modifications may be resorted to without departing from the principles of the invention as indicated by the scope of the following claims.

I claim:

1. A foldable step unit for a truck having a bumper with a flat top surface comprising: a step; a pair of supports to span and to be pivotally connected near an end of each support to the step; means for linking between each of the supports and an adjacent side of the step for allowing the step to move from an in line position to a position normal with respect to the support, said means comprising an offset link having a pair of slots, and means for joining one of the slots to the support and for joining the other slot to the step; and a pair of bars each rigidly secured at one end thereof to the bumper and pivotally connected at the other end to a respective one of the supports to permit the supports with the step to move between a parallel folded position and a perpendicular use position with respect to the top surface of the bumper.

2. A foldable step unit for a truck, having a bumper with a flat top surface, with a useable step moveable from a position folded above the bumper to an unfolded position extending out from and below the bumper top surface, wherein the step comprises: a pair of spaced apart bars fastened to the top of the bumper; a separate L-shaped support member pivotally fastened to each of the bars near an end of a short arm of the support member; a step pivotally connected to and extending between the free ends of long arms of the L-shaped support members; and a separate offset link extending between and pinned to the L-shaped support member and an adjacent side of the step, said links each having a pair of slots to be slidably engaged by the pins to permit the step to move from a position normal to the supports to a position parallel to the supports.

3. A foldable step unit for a truck having a bumper as in claim 2 wherein the legs extend upward from the top of the bumper to permit clearing the back of the bumper when the step is folded above.

* * * * *